(12) United States Patent
Iwamura et al.

(10) Patent No.: US 8,301,146 B2
(45) Date of Patent: Oct. 30, 2012

(54) MOBILE COMMUNICATION SYSTEM, USER APPARATUS AND METHOD

(75) Inventors: Mikio Iwamura, Yokohama (JP); Takehiro Nakamura, Yokohama (JP)

(73) Assignee: NTT DoCoMo, Inc., Tokyo (JP)

(\*) Notice: Subject to any disclaimer, the term of this patent is extended or adjusted under 35 U.S.C. 154(b) by 78 days.

(21) Appl. No.: 12/672,935

(22) PCT Filed: Aug. 15, 2008

(86) PCT No.: PCT/JP2008/064636
§ 371 (c)(1),
(2), (4) Date: Apr. 21, 2010

(87) PCT Pub. No.: WO2009/025240
PCT Pub. Date: Feb. 26, 2009

(65) Prior Publication Data
US 2011/0171962 A1    Jul. 14, 2011

(30) Foreign Application Priority Data
Aug. 17, 2007   (JP) ................................. 2007-213147

(51) Int. Cl.
*H04W 36/00* (2009.01)
(52) U.S. Cl. ............... 455/437; 455/435.2; 455/444; 455/67.11; 455/226.1
(58) Field of Classification Search .......... 455/435.1, 455/435.2, 436–441, 444, 67.11, 226.1
See application file for complete search history.

(56) References Cited

U.S. PATENT DOCUMENTS

| | | | | |
|---|---|---|---|---|
| 5,353,332 A | * | 10/1994 | Raith et al. ................... | 455/455 |
| 7,444,150 B2 | * | 10/2008 | Rick et al. .................... | 455/436 |
| 7,480,519 B2 | * | 1/2009 | Jeong et al. ................... | 455/525 |
| 2005/0009555 A1 | | 1/2005 | Iwanaga et al. | |

(Continued)

FOREIGN PATENT DOCUMENTS

JP   05-102923 A   4/1993

(Continued)

OTHER PUBLICATIONS

Patent Abstracts of Japan, Publication No. 2004-201118, dated Jul. 15, 2004, 1 page.

(Continued)

*Primary Examiner* — Temica M Beamer
(74) *Attorney, Agent, or Firm* — Osha Liang LLP

(57) ABSTRACT

A disclosed user apparatus is for use in a mobile communication system including a macrocell and a closed cell wherein unspecified users are allowed to access the macrocell and specified users are allowed to access the closed cell. The user apparatus includes a measurement unit configured to measure quality of a signal provided from a camped cell in an idle state at a predefined cycle, a cell search unit configured to measure quality of a signal provided from a neighbor cell at a predefined cell search cycle, and a cell reselection unit configured to reselect a cell depending on the cell search result. A frequency of the macrocell is at least partially identical to a frequency of the closed cell. If the user apparatus resides in the macrocell and a predefined reselection criterion is satisfied, the closed cell adjacent to the camped cell is reselected as a standby cell. The predefined reselection criterion corresponds to a state where the quality of the signal provided from the closed cell has been higher than or equal to the quality of the signal provided from the camped cell by a predefined threshold for more than a predefined reselection duration.

14 Claims, 6 Drawing Sheets

U.S. PATENT DOCUMENTS

2009/0067386 A1* 3/2009 Kitazoe ............... 370/332

FOREIGN PATENT DOCUMENTS

| JP | 2000-514267 A | 10/2000 |
| JP | 2002-165249 A | 6/2002 |
| JP | 2004-201118 A | 7/2004 |
| JP | 2004-357006 A | 12/2004 |
| JP | 2006-129158 A | 5/2006 |
| JP | 2006-516854 A | 7/2006 |

OTHER PUBLICATIONS

Patent Abstracts of Japan, Publication No. 2006-129158, dated May 18, 2006, 1 page.

Patent Abstracts of Japan, Publication No. 2002-165249, dated Jun. 7, 2002, 1 page.

3GPP TS 36.300 V8.1.0, Jun. 2007, "Evolved Universal Terrestrial Radio Access (E-UTRA) and Evolved Universal Terrestrial Radio Access Network (E-UTRAN)," 106 pages.

3GPP TS 36.304 V0.0.0, Jun. 2007, "Evolved Universal Terrestrial Radio Access (E-UTRA) User Equipment (UE) procedures in idle mode," 17 pages.

3GPP TSG RAN WG2 #58bis, R2-072825, Orlando, US, Jun. 25-29, 2007, "Triggering of measurements in LTE_IDLE for CSG cells," 2 pages.

3GPP TSG RAN WG2 #58bis, R2-072828, Orlando, US, Jun. 25-29, 2007, "Camping on and accessing to CSG cells in LTE_IDLE," 2 pages.

International Search Report issued in PCT/JP2008/064636, mailed on Nov. 4, 2008, with translation, 9 pages.

Written Opinion issued in PCT/JP2008/064636, mailed on Nov. 4, 2008, 3 pages.

Japanese Office Action for Application No. 2010-176179, mailed on Jan. 4, 2012 (4 pages).

Patent Abstracts of Japan for Japanese Publication No. 05-102923, publication date Apr. 23, 1993 (1 page).

Patent Abstracts of Japan for Japanese Publication No. 2004-357006, publication date Dec. 16, 2004 (1 page).

Extended European Search Report for Application No. 08827892.4, mailed on Feb. 9, 2012 (7 pages).

Nokia Siemens Networks, Nokia, "E-UTRA Measurements and Cell Reselection Considerations", 3GPP TSG-RAN WG2 Meeting #58bis, R2-072386 and R2-071727, Orlando, U.S.A., Jun. 25-29, 2007.

Russian Office Action for Application Number 2010108347/07, mailed on Mar. 15, 2012 (20 pages).

* cited by examiner

MOBILE COMMUNICATION SYSTEM, USER APPARATUS AND METHOD

TECHNICAL FIELD

The present invention relates to a mobile communication system, a user apparatus and a method.

BACKGROUND ART

A user apparatus or user equipment (UE) in a mobile communication system changes its operating mode from an active state to an idle state after a call is finished. The active state may be referred to as a connection state, and the idle state may be referred to as a standby state. In the standby state, user apparatuses are not managed as to which cells they are residing in but managed as to which tracking areas (TAs) they belong to. The tracking area (TA) may be referred to as a location registration area, a routing area (RA), a location area (LA) or others and is an area where paging is concurrently performed upon incoming calls. The TA may be managed by an upper node such as a MME/UPE to a base station eNB.

FIG. 1 schematically illustrates a mobile communication system. In the illustration, the first tracking area TA1 includes three cells (cell 1, cell 2, cell 3), and the second tracking area TA2 includes two cells (cell 4, cell 5). It is assumed that a user apparatus UE residing in cell 1 has finished a call and entered the standby state. In general, base stations for cells broadcast cell identification information (cell ID) and tracking area identification information (TA-ID) as broadcast information (BCH). For this reason, the user apparatus UE would know that the TA-ID for the camped cell is for TA1. It is assumed that the user apparatus has moved to cell 3 while being kept in the standby state. Then, the user apparatus UE receives the broadcast information from a base station for cell 3 and can recognize the cell identification information and the TA-ID. Since cell 1 and cell 3 belong to the same tracking area (TA1), no tracking area change request is issued. Furthermore, it is assumed that the user apparatus UE has moved from cell 3 to cell 5 while being kept in the standby state. Then, the user apparatus UE receives the broadcast information (BCH) from abase station for cell 5 and can recognize that the tracking area has changed from TA1 to TA2. Upon recognizing this change, the user apparatus UE transmits a request for changing the tracking area to the base station for cell 5. Then, the base station transmits a signal for requesting update of the tracking area to an upper node such as a MME/UPE and updates the tracking area for the user apparatus UE from TA1 to TA2. Subsequently, when calls for the user apparatus UE are incoming, calling (paging) is performed in the tracking are TA2. In this manner, the update of tracking areas (tracking area update (TAU)) is performed in response to requests from user apparatuses. Note that one or more tracking areas may be associated with one user apparatus as in the case of next generation mobile communication systems such as LTE (long Term Evolution) systems.

In recent years, cells called closed subscriber group (CSG) cells as illustrated in FIG. 2 have been increasingly used. A network including the CSG cells may be referred to as a private network (P-NW), a home network or others. The CSG cell may a mobile communication network which only company staff members in a certain company can access within a building of the company, a mobile communication network which only family members can access, a mobile communication network accessible within a school ground, a mobile communication network accessible within a certain shop or other mobile communication networks. For example, user apparatuses possessed by company staff members can communicate in the CSG cell within the company and communicate in a macrocell outside of the company building. A network using such a macrocell may be also called a public network and be a public mobile communication network rather than a private network. Users that are not staff members of that company are prevented from communicating in the CSG cell within the building.

As a result, a cell reselected by a user apparatus operating in the idle state may be a macrocell or a CSG cell. It is preferred that a user belonging to any CSG be in standby in the associated CSG cell. In other words, it is preferred that a moving user apparatus reselect the CSG cell which the user apparatus belongs to. For example, in a document R2-072825 "Triggering of measurements in LTE_IDLE for CSG Cells" Vodafone, some techniques are disclosed for efficiently searching for CSG cells through distinction between locations where the CSG cells are likely to be present and locations where the CSG cells are not likely to be present.

DISCLOSURE OF INVENTION

Problem to be Solved by the Invention

Conventional cell reselection for macrocells is performed only if a signal quality $Q_n$ provided from an adjacent macrocell is significantly higher than a signal quality $Q_s$ provided from the resident macrocell. More specifically, the cell reselection is performed if $(Q_n+Q_{offset})$ has been higher than $(Q_s+Q_{hyst})$ for more than a predefined duration $T_{reselection}$. The $Q_{offset}$ is a predefined offset value and may be used in the case where faster reselection of a certain cell, such as a cell for covering a tunnel, may be desired, although it is not normally used. Also, the $Q_{hyst}$ is a predefined value for introducing hysteresis characteristics. In this manner, delay of the cell reselection can be reduced near cell edges. Whenever the cell reselection is performed, a user apparatus operating in the idle state receives broadcast information from the reselected cell and sets various parameters for use in the cell. However, such frequent receptions of the broadcast information may consume battery energy. Also, if the reselected cell belongs to a different tracking area, tracking area update is activated, and the involved signal transmission and reception may consume the battery energy. Thus, the reduction in the cell reselection latency can conserve the battery energy.

In addition, in the conventional cell reselection for macrocells, if the signal quality $Q_s$ of the resident macrocell is higher than a predefined threshold, search and $(Q_n)$ measurement for neighbour cells can be omitted. This can further conserve the battery energy during standby, which results in longer standby duration.

According to the above-stated manner, however, in the situation illustrated in FIG. 2, it is more likely that the CSG cell 1 may be reselected while it is less likely that the CSG cell 2 may be reselected. Since the CSG cell 2 exists within the macrocell and the signal quality $Q_s$ is relatively higher in the camped cell, it is less likely that the above condition may be satisfied. In other words, since the signal quality $Q_s$ of the resident macrocell is higher than or equal to the predefined threshold in the CSG cell 2, the cell search is not activated, and thus the CSG cell 2 would not be detected. Alternatively, even if the $Q_s$ is lower than the predefined threshold and thus the CSG cell 2 is detected through the cell search, it is more likely that the CSG cell 2 may not be selected due to the predefined condition $(Q_n+Q_{offset}>Q_s+Q_{hyst})$ not being satisfied in comparison between the signal qualities $Q_n$ and $Q_s$. For this reason, the conventional cell reselection has some problems in that the CSG cells cannot be appropriately selected in situations where the macrocells and the CSG cells are mixed.

One object of the present invention is to enable a user apparatus operating in the idle state to reselect cells suitable for standby appropriately in a mobile communication system where the macrocells and the CSG cells are mixed.

Means for Solving the Problem

One aspect of the present invention relates to a user apparatus for use in a mobile communication system including a macrocell and a closed cell wherein unspecified users are allowed to access the macrocell and specified users are allowed to access the closed cell. The user apparatus includes a measurement unit configured to measure quality of a signal provided from a camped cull in an idle state at a predefined cycle, a cell search unit configured to measure quality of a signal provided from a neighbour cell at a predefined cell search cycle, and a cell reselection unit configured to reselect a cell depending on the cell search result. A frequency of the macrocell is at least partially identical to a frequency of the closed cell. If the user apparatus resides in the macrocell and a predefined reselection criterion is satisfied, the closed cell adjacent to the camped cell is reselected as a standby cell. The predefined reselection criterion corresponds to a state where the quality of the signal provided from the closed cell has been higher than or equal to the quality of the signal provided from the camped cell by a predefined threshold for more than a predefined reselection duration.

Advantage of the Invention

According to the present invention, a user apparatus operating in the idle state can reselect cells suitable for standby appropriately in a mobile communication system where the macrocells and the CSG cells are mixed.

LIST OF REFERENCE SYMBOLS

Figure 1:
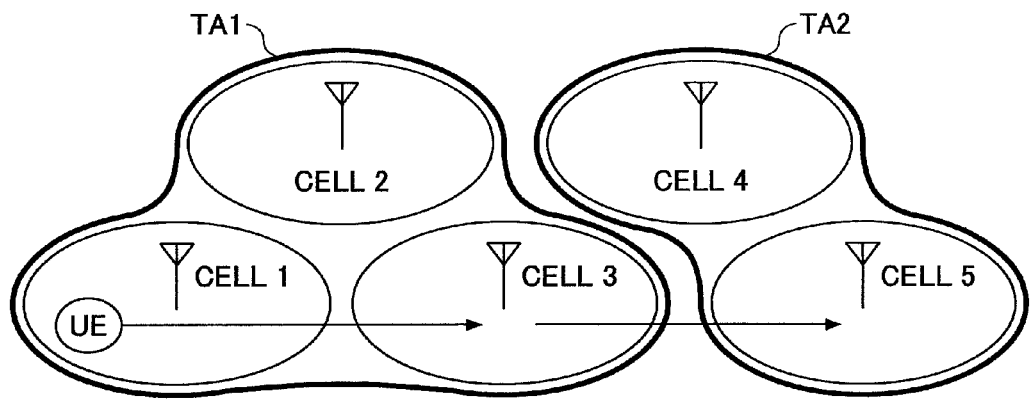
FIG. 1 schematically illustrates a mobile communication system.
Figure 2:
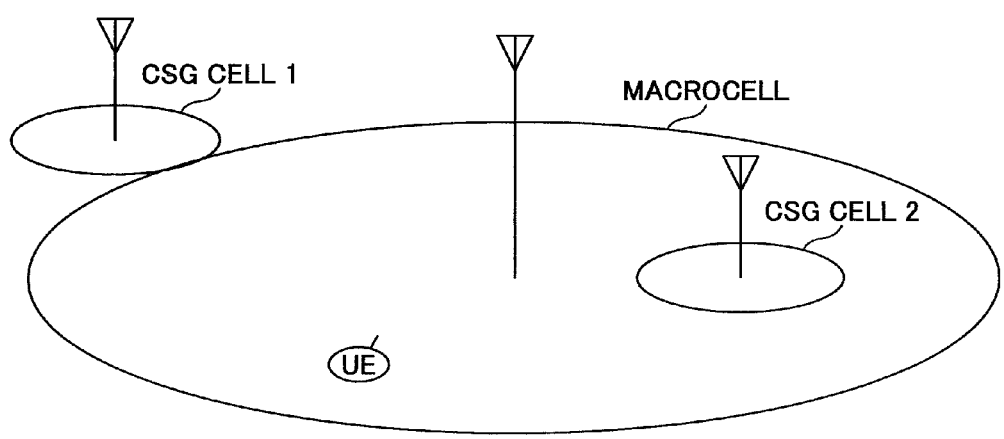
FIG. 2 illustrates a macrocell and CSG cells.

31: radio frequency (RF) reception unit
32: cell search unit
33: BCH acquisition unit
34: control unit
35: SIR measurement unit
36: cell selection unit

BEST MODE FOR CARRYING OUT THE INVENTION

As stated above, there is a likelihood that a user apparatus may reselect not only a macrocell but also a CSG cell. In addition, the macrocell and the CSG cell may use the same frequency or different frequencies or radio access technologies (RATs). For convenience, "different frequencies" used herein mean that the cells use not only such different frequencies but also "different RATs". Some exemplary operations for cell reselection of a user apparatus are described in detail below.

[From Macrocell to CSG Cell Having the Same Frequency]

Figure 3:
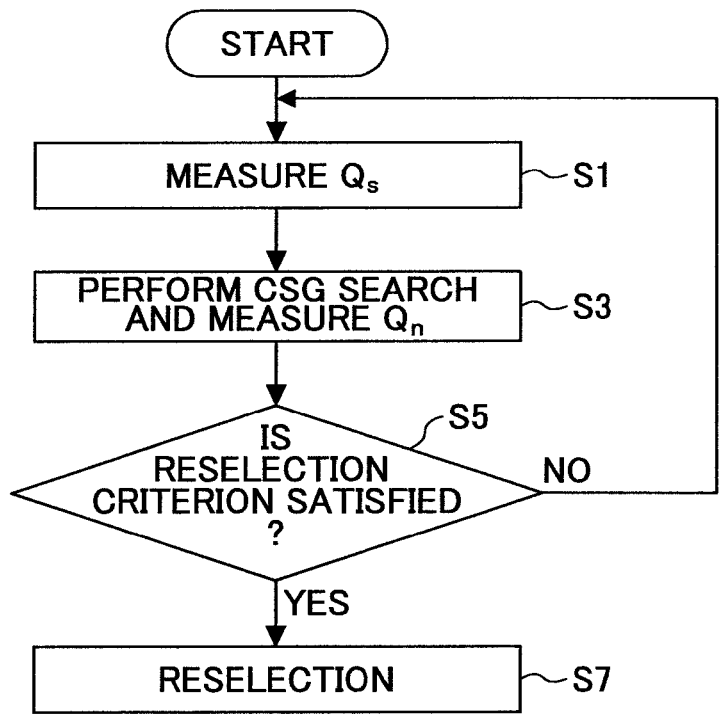
FIG. 3 is a flowchart illustrating an exemplary operation for the case where a user residing in a macrocell reselects a CSG cell having the same frequency.
Figure 3:
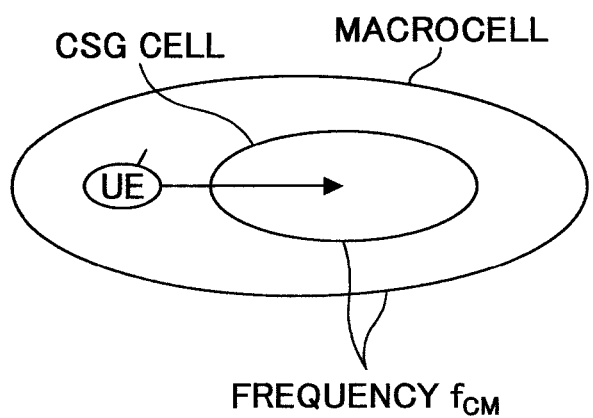

FIG. 3 illustrates an exemplary operation for the case where a user residing in a macrocell reselects a CSG cell having the same frequency. This operation flow is mainly performed in the user apparatus. At step S1, the user apparatus measures a reception quality $Q_s$ for a signal transmitted from a camped cell (serving cell). This measurement is performed at a predefined measurement cycle. The reception quality $Q_s$ may be any appropriate amount representative of signal quality. For example, the reception quality $Q_s$ may be represented by reception power for downlink reference signals (RSRP or RSSI), desired signal power to undesired signal power ratio (Es/Io, SIR or SINR) and/or a combination thereof.

At step S3, the reception quality $Q_n$ for signals transmitted from neighbour cells (may be also referred to as neighboring cells) is measured. This signal quality may be also represented by any appropriate amount as in the case of the $Q_s$. The measurement is also performed at a predefined frequency. This may significantly differ from common cell reselection. In common cell reselection between macrocells, when the signal quality $Q_s$ becomes lower than a predefined level in the camped cell, the signal quality $Q_n$ of a neighbour cell begins to be measured, and otherwise, the signal quality $Q_n$ may not have to be measured. Regardless of this condition, signals from the neighbour cells (CSG cells) are measured at the predefined frequency at step S3. This is preferred to detect the CSG cells rapidly. As stated above, when the neighbour cells include a macrocell and/or a CSG cell, some existing schemes can be applied to the cell reselection between the macrocells. This flow is focused on the case where the camped cell and the neighbour cell correspond to a macrocell and a CSG cell, respectively.

The CSG cell can be accessed by only certain users. Thus, even if the CSG cell is detected, a user may not be allowed to access the CSG cell. In one non essential method, it may be determined at step S3 whether the user is allowed to access the detected CSG cell. This determination can be made using broadcast information from the detected CSG cell. Although not explicitly illustrated in FIG. 3, if the detected CSG cell can be accessed by the user apparatus, the flow proceeds to step S5, and otherwise, the flow returns to step S1. According to this method, subsequent steps in FIG. 3 do not have to be unnecessarily performed for the CSG cell inaccessible by the user apparatus.

At step S5, it is determined whether the detected CSG cell satisfies a predefined reselection criterion. If the reselection criterion is satisfied, the flow proceeds to step S7 where the detected cell is reselected as a standby cell. On the other hand, if the reselection criterion is not satisfied, the flow returns to step S1 and the above-mentioned procedure is performed again.

The reselection criterion corresponds to the state where a value derived by adding a predefined offset $Q_{offset}$ to the signal quality $Q_n$ provided from the detected CSG cell has been greater than a value derived by adding a predefined hysteresis threshold $Q_{hyst}$ to the signal quality $Q_s$ provided in the resident macrocell for more than a predefined reselection duration $T_{reselection}$. In other words, the relationship $(Q_n+Q_{offset})>(Q_s+Q_{hyst})$ remains for more than $T_{reselection}$ seconds. The signal qualities $Q_s$ and $Q_n$ for the resident and other cells are compared in additional consideration of the offset $Q_{offset}$ and the hysteresis $Q_{hyst}$, and it is required that the neighbour cell has had better signal quality for the predefined duration $T_{reselection}$. Typically, the reselection criterion is not satisfied until the user apparatus not only resides near coverage of the neighbour cell but also enters the neighbour cell to some extent. Such strict reselection criterion is set due to the fact that macrocells and CSG cells operate at the same frequency $f_{CM}$. Due to this fact, if the cell reselection is not performed under strict comparison between the signal qualities $Q_s$ and $Q_n$, it is likely that the user apparatus may be subject to significant interference in communications after the cell reselection.

In the above-mentioned embodiment, when the CSG cell is detected at step S3, it is determined whether the user apparatus is allowed to access the CSG cell. However, the determination is not be necessarily performed upon the detection of the CSG cell at step S3 and may be performed after step S5. In this case, the reselection criterion is determined at step S5 for the CSG cell detected at step S3, and if the reselection criterion is satisfied, the CSG cell may be determined as a candidate of a standby cell. Then, broadcast information is received from the CSG cell, and it is determined whether the user apparatus is allowed to access the CSG cell. If the user apparatus is allowed to access the CSG cell, the CSG cell is reselected as the standby cell. On the other hand, if the user apparatus is not allowed to access the CSG cell, the flow returns to step S1. According to this method, after the reselection cell candidate has been determined at steps S5 and S7, the broadcast information is received from the CSG cell. As a result, the broadcast information from CSG cells failing to satisfy the reselection criterion does not have to be unnecessarily analyzed.

[From CSG Cell to Macrocell Having the Same Frequency]

Figure 4:
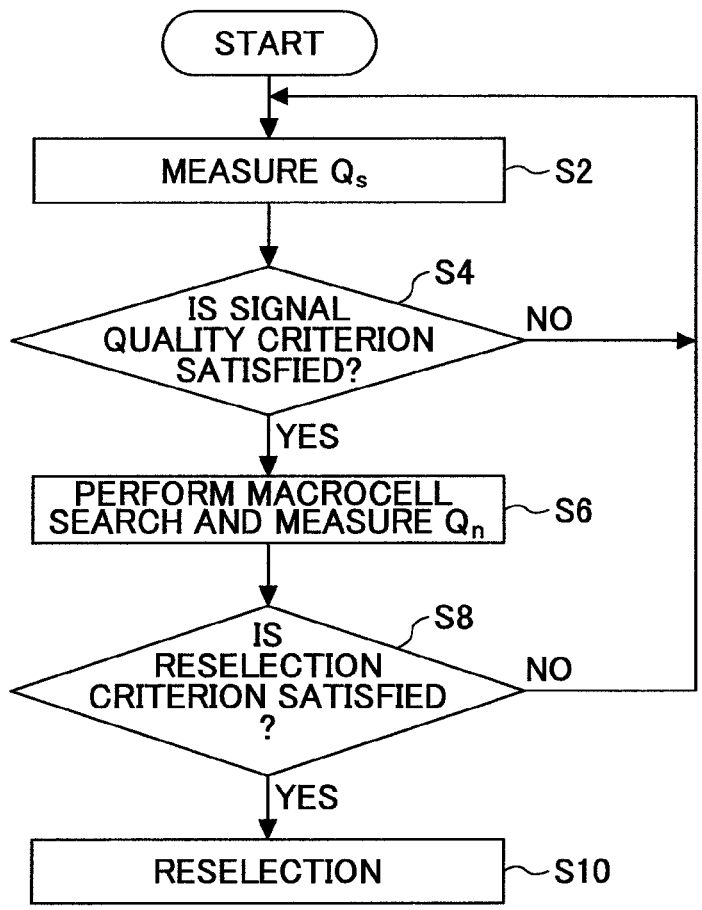
FIG. 4 is a flowchart illustrating an exemplary operation for the case where a user residing in a CSG cell reselects a macrocell having the same frequency.
Figure 4:
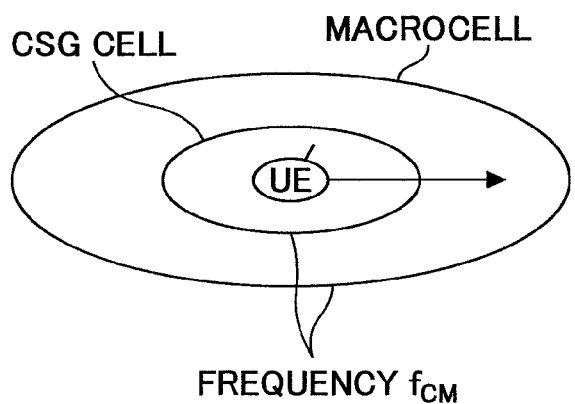

FIG. 4 illustrates an exemplary operation for the case where a user residing in a CSG cell reselects a macrocell having the same frequency. Similar to step S1 in FIG. 3, at step S2, a user apparatus measures reception quality $Q_s$ for a signal transmitted from the camped cell (serving cell). This embodiment differs from the embodiment illustrated in FIG. 3 in that the serving cell corresponds to a CSG cell. The measurement is performed at a predefined measurement cycle. The reception quality $Q_s$ may be any appropriate amount representative of signal quality.

At step S4, it is determined whether the signal quality $Q_s$ in the camped cell satisfies a predefined signal quality criterion. If the signal quality criterion is satisfied, the flow proceeds to step S6, and otherwise, the flow returns to step S2. The signal quality criterion corresponds to the state where the signal quality $Q_s$ in the serving cell is lower than a predefined threshold. The predefined threshold may be a SintraSearch value for cell reselection between CSG cells, a SinterSearch value for cell reselection between a CSG cell and a macrocell or a combination thereof.

At step S6, the reception quality $Q_n$ for a signal transmitted from a neighbour cell (macrocell) is measured. The signal quality $Q_n$ may be also any appropriate amount similar to the quality $Q_s$. This step differs from step S3 illustrated in FIG. 3 in that the measurement is performed only if the signal quality criterion is satisfied at step S4. This is why the user apparatus should reside in the CSG cell as long as possible and prevention of the neighbour cell search for the better resident CSG cell can reduce battery energy consumption. Also, the macrocells have broader coverage, and thus even if the cell search is activated after degradation of the quality of the CSG cell to some extent, the macrocell can be detected without difficulty.

At step S8, it is determined whether the detected macrocell satisfies a predefined reselection criterion. If the reselection criterion is satisfied, the flow proceeds to step S10 where the detected macrocell is reselected as a standby cell. On the other hand, if the reselection criterion is not satisfied, the flow returns to step S2, and the above-mentioned steps are performed again.

The reselection criterion corresponds to the state where a value derived by adding a predefined offset $Q_{offset}$ to the signal quality $Q_n$ provided from the detected macrocell has been greater than a value derived by adding a predefined hysteresis threshold $Q_{hyst}$ to the signal quality $Q_s$ in the resident CSG cell for more than a predefined reselection duration $T_{reselection}$.

In other words, the criterion $(Q_n+Q_{offset})>(Q_s+Q_{hyst})$ remains during more than the predefined $T_{reselection}$ seconds. The signal qualities $Q_s$ and $Q_n$ of the resident and other cells are compared in additional consideration of the offset $Q_{offset}$ and the hysteresis $Q_{hyst}$, and it is required that the neighbour cell has had better signal quality for more than the predefined duration $T_{reselection}$. Typically, the reselection criterion is not satisfied until the user apparatus not only resides near the coverage of the neighbour cell but also enters the neighbour cell to some extent. Such strict reselection criterion is set due to the fact that the macro cell and the CSG cell operate at the same frequency $f_{CM}$. Due to this fact, if the cell reselection is not performed through strict comparison between the signal qualities $Q_s$ and $Q_n$, it is likely that the user apparatus may be subject to significant interference in communications after the cell reselection.

[From Macrocell to CSG Cell Having Different Frequency]

Figure 5:
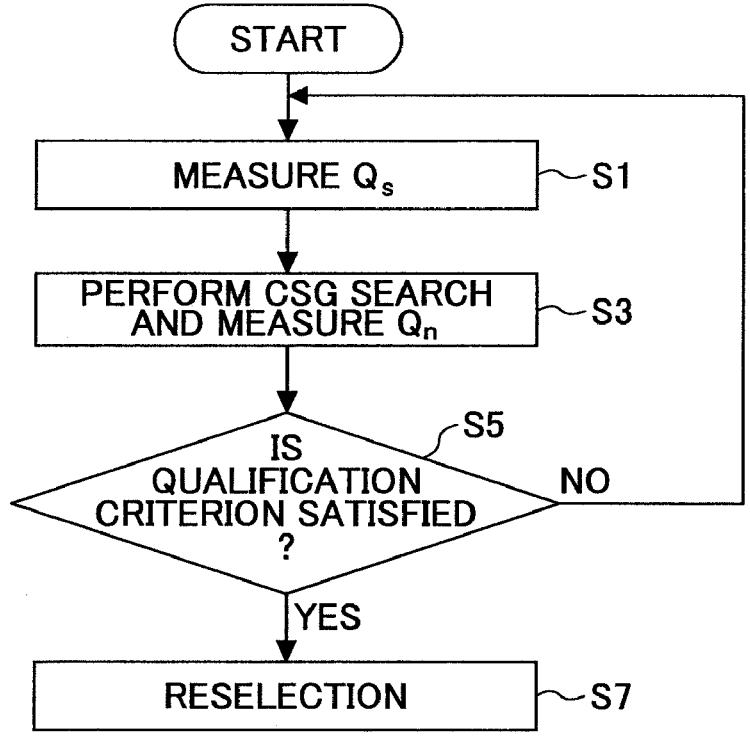
FIG. 5 is a flowchart illustrating an exemplary operation for the case where a user residing in a macrocell reselects a CSG cell having a different frequency.
Figure 5:
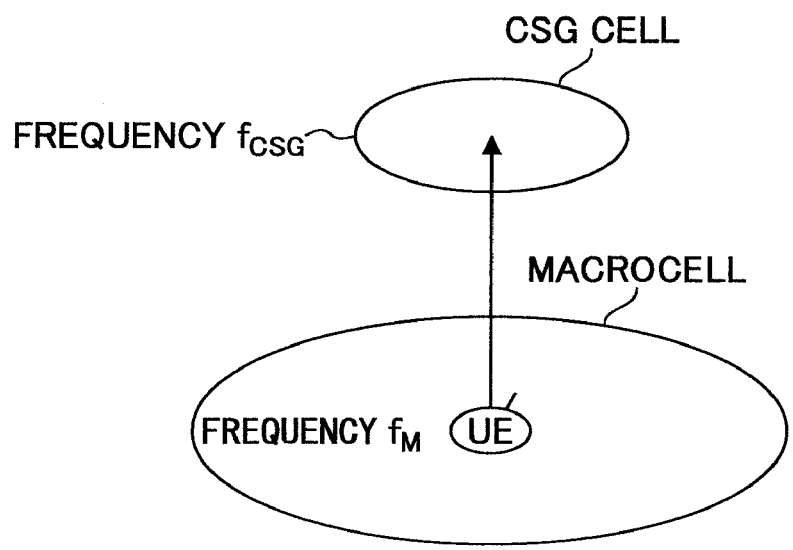

FIG. 5 illustrates an exemplary operation for the case where a user residing in a macrocell reselects a CSG cell having a different frequency. At step S1, a user apparatus measures reception quality $Q_s$ of a signal transmitted from the camped cell. The measurement is performed at a predefined measurement cycle. The reception quality $Q_s$ may be any appropriate amount representative of signal quality.

At step S3, a reception quality $Q_n$ of a signal transmitted from a neighbour cell (CSG cell) having a different frequency is measured. This signal quality may be also any appropriate amount similar to the quality $Q_s$. The measurement is performed at a predefined frequency. This differs from common cell reselection as in the case of step S3 in FIG. 3. Also, it is may be determined at this step or after the cell reselection as stated above whether the user apparatus is allowed to access the detected CSG cell.

At step S5, it is determined whether the detected CSG cell satisfies a predefined suitability criterion. If the suitability criterion is satisfied, the flow proceeds to step S7 where the detected CSG cell is reselected as a standby cell. On the other hand, if the suitability criterion is not satisfied, the flow returns to step S1, and the above-mentioned procedure is performed again. The suitability criterion corresponds to the state where the signal quality $Q_n$ provided from the detected CSG cell is greater than a value derived by adding a predefined hysteresis threshold $Q_{hyst}$ to the minimum quality $Q_{min}$ to be guaranteed in the camped cell, that is, $Q_n>(Q_{min}+Q_{hyst})$.

Note that the suitability criterion is less strict for cell reselection than the reselection criterion described in conjunction with FIGS. 3 and 4. This is due to the fact that the macrocell and the CSG cell operate at different frequencies $f_M$ and $f_{CSG}$, respectively. The different frequencies reduce the likelihood that the user apparatus may be subject to significant interference from the macrocell after the cell reselection to the CSG cell. As a result, if the signal quality $Q_n$ satisfies a threshold determined for the minimum level $Q_{min}$ required for stable communications in consideration of the hysteresis, the cell reselection can be performed. The signal quality $Q_n$ is not required to exceed the signal quality $Q_s$ provided from the camped cell. Here, the $Q_{hyst}$ corresponds to a hysteresis to guarantee the minimum quality $Q_{min}$ in transition to the CSG cell and is effective to reduce the likelihood that the signal quality is lower than the $Q_{min}$ immediately after the transition, the likelihood of being out-of-area, and the likelihood that other cells are searched for or reselected.

[From CSG cell to CSG Cell Having the Same Frequency or Macrocell Having Different Frequency]

Figure 6:
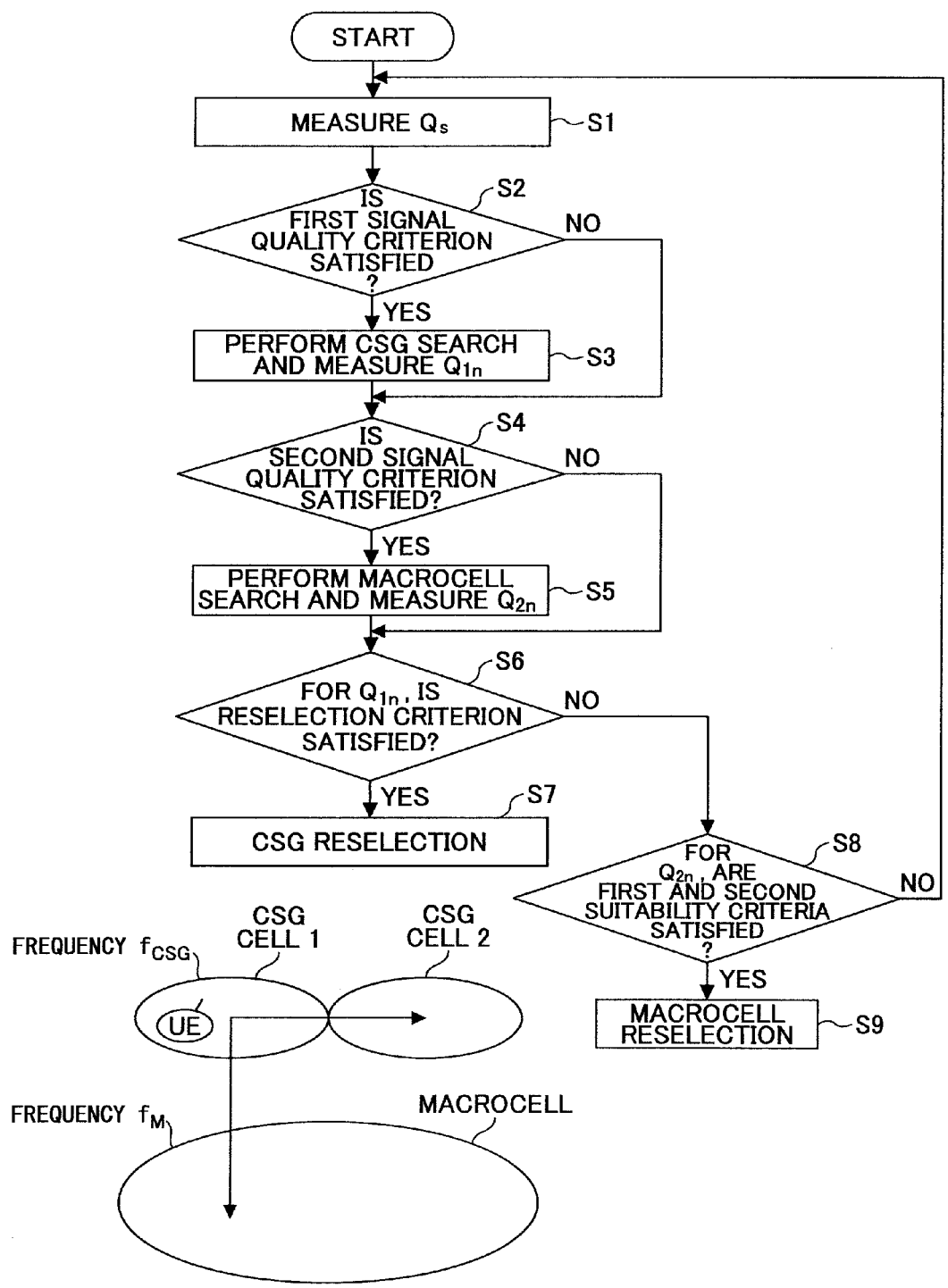
FIG. 6 is a flowchart illustrating an exemplary operation for the case where a user residing in a macrocell reselects a CSG cell having the same frequency or a macrocell having a different frequency.

FIG. 6 is a flowchart illustrating an exemplary operation for the case where a user residing in a CSG cell reselects a CSG cell having the same frequency or a macrocell having a different frequency. At step S1, a user apparatus measures reception quality $Q_s$ of a signal transmitted from the camped cell (serving cell). In this embodiment, the serving cell corresponds to a CSG cell. The measurement is performed at a predefined measurement cycle. The reception quality $Q_s$ may be any appropriate amount representative of signal quality.

At step S2, it is determined whether the signal quality in the camped cell satisfies a predefined first signal quality criterion. If the first signal quality criterion is satisfied, the flow proceeds to step S3, and otherwise, the flow proceeds to step S4. The first signal quality criterion corresponds to the state where the signal quality $Q_s$ in the serving cell is lower than a predefined threshold. The predefined threshold corresponds to a SintraSearch value for cell reselection between CSG cells.

At step S3, the user apparatus measures reception quality $Q_{1n}$ of a signal transmitted from a neighbour cell (CSG cell) having the same frequency. This signal quality may be also represented by any appropriate amount similar to the $Q_s$. The measurement may be performed at a predefined frequency similar to step S3 in FIG. 3, but since the user apparatus presently resides the CSG cell in the present embodiment, the measurement does not have to be performed as frequently as in step S3 in FIG. 3. Rather, it is preferred that the number of measurements be reduced as much as possible for battery energy savings. For this reason, it is preferred that similar to common cell reselection between macrocells, if the signal quality $Q_s$ in the camped cell falls below a predefined level, the measurement of the signal quality $Q_{1n}$ provided from a neighbour cell be activated, and otherwise, the measurement of the $Q_{1n}$ be prevented. Also, it may be determined at this step or after the cell reselection as stated above whether the user apparatus is allowed to access the detected CSG cell.

At step S4, it is determined whether the signal quality $Q_s$ in the camped cell satisfies a predefined second signal quality criterion. If the second signal quality criterion is satisfied, the flow proceeds to step S5, and otherwise, the flow proceeds to step S6. The second signal quality criterion corresponds to the state where the signal quality $Q_s$ in the serving cell is lower than a predefined threshold. The predefined threshold corresponds to a SinterSearch value for cell reselection between the CSG cell and the macrocell.

At step S5, the user apparatus measures reception quality $Q_{2n}$ of a signal transmitted from a neighbour cell (macrocell) having a different frequency similar to step S6 in FIG. 4. This signal quality may be also represented by any appropriate amount similar to the $Q_s$. The measurement is performed only if the second signal quality criterion is satisfied, as in the case of step S6 in FIG. 4.

At step S6, similar to step S5 in FIG. 3, it is determined whether the detected CSG cell having the same frequency satisfies a predefined reselection criterion. If the reselection criterion is satisfied, the flow proceeds to step S7 where the detected CSG cell is reselected as a standby cell. If the reselection criterion is not satisfied, the flow proceeds to step S8. The reselection criterion corresponds to the state where a value derived by adding a predefined offset $Q_{offset}$ to the signal quality $Q_{1n}$ provided from the detected CSG cell has been greater than a value derived by adding a hysteresis threshold $Q_{hyst}$ to the signal quality $Q_s$ in the camped cell for more than a predefined reselection duration $T_{reselection}$.

In other words, the relationship $(Q_{1n}+Q_{offset})>(Q_s+Q_{hyst})$ has held for more than $T_{reselection}$ seconds. The signal qualities $Q_s$ and $Q_{in}$ for the resident and other cells are compared in additional consideration of the offset and the hysteresis, and it is required that the neighbour cell have had better signal quality for more than a predefined duration.

At step S8, it is determined whether the detected macrocell having a different frequency satisfies predefined suitability criteria. If the suitability criteria are satisfied, the detected macrocell is reselected as a standby cell at step S9. On the other hand, if the suitability criteria are not satisfied, the flow returns to step S1, and the above-stated procedure is performed again. The suitability criteria are divided into first and second suitability criteria, and if both the first and second suitability criteria are satisfied, the original suitability criteria are satisfied.

The first suitability criterion corresponds to the state where no appropriate CSG cell is present or any CSG cells are inappropriate. The appropriate CSG cell (neighbour cell) corresponds to a cell that can provide signal quality Q higher than a value derived by adding the predefined hysteresis threshold $Q_{hyst}$ to the minimum quality $Q_{min}$ to be guaranteed in the camped cell ($Q>(Q_{min}+Q_{hyst})$). In this case, the signal quality Q includes both the signal quality $Q_s$ provided from the resident CSG cell and the signal quality $Q_{1n}$ provided from the adjacent CSG cell. Also, another criterion $Q>Q_{min}$ may be used instead of the criterion $Q>(Q_{min}+Q_{hyst})$. More specifically, if the relationship $Q_s>Q_{min}$ is not satisfied for the signal quality $Q_s$ provided from the resident CSG cell and the relationship $Q_{1n}>(Q_{min}+Q_{hyst})$ is not satisfied for the signal quality $Q_{1n}$ provided from the detected adjacent CSG cell, the first suitability criterion is satisfied.

The second suitability criterion corresponds to the state where at least one appropriate macrocell is present. The appropriate macrocell (neighbour cell) corresponds to a macrocell that can provide signal quality $Q_{2n}$ higher than a value derived by adding a predefined hysteresis threshold $Q_{hyst}$ to the minimum quality $Q_{min}$ to be guaranteed in the camped cell ($Q_{2n}>(Q_{min}+Q_{hyst})$).

If any of adjacent CSG cells satisfies the reselection criterion at step S6, that adjacent CSG cell is determined as a reselection cell at step S7. Only if no adjacent CSG cell has quality enough to satisfy the first suitability criterion, the appropriate macrocell is reselected as the standby cell at step S9. If any of adjacent CSG cells has quality enough to satisfy the first suitability criterion but not to satisfy the reselection criterion, the flow returns to step S1. According to this embodiment, the reselection to the macrocell is prevented while there is a likelihood of the CSG cell being reselected so that the user can stay in the CSG cell as long as possible.

[User Apparatus]

Figure 7:
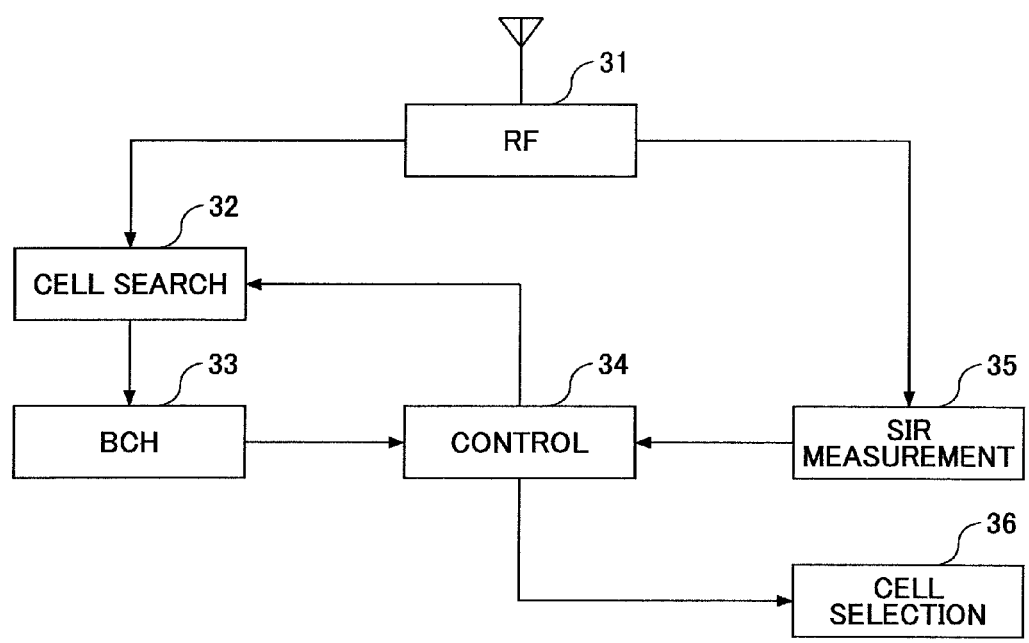
FIG. 7 illustrates a user apparatus according to one embodiment of the present invention.

FIG. 7 illustrates a user apparatus according to one embodiment of the present invention. In FIG. 7, a radio frequency (RF) reception unit 31, a cell search unit 32, a BCH acquisition unit 33, a control unit 34, a SIR measurement unit 35 and a cell selection unit 36 are illustrated.

The radio frequency (RF) unit 31 converts received radio frequency signals into baseband digital signals.

The cell search unit 32 detects cells providing a larger amount of reception power based on reference signals in received signals. The reference signals are known to the transmitter side and the receiver side and may be also referred to as known signals, pilot signals, training signals or others.

The BCH acquisition unit 33 acquires broadcast signals (BCHs) transmitted from cells identified by the cell search unit 32 and extracts broadcast information from the signals. The broadcast information includes information items required to determine whether cells correspond to CSG cells and whether users are allowed to access the CSG cells in conjunction with the present invention, in addition to general information items such as cell IDs.

The control unit 34 controls functional elements according to the present invention. Particularly, the control unit 34 determines the above-mentioned signal quality criteria, the reselection criteria, the suitability criteria and other criteria.

The SIR measurement unit 35 measures reception quality of reference signals from the camped cell. In this embodiment, the reception quality is evaluated in SIR but may be represented by any appropriate indicator known in this technical field such as SINR.

The cell selection unit 36 reselects cells if the reception quality is higher than or equal to a predefined threshold. Requests for changing tracking areas are issued to base stations as needed.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-213147 filed on Aug. 17, 2007, the entire contents of which are hereby incorporated by reference.

The invention claimed is:

1. A user apparatus for use in a mobile communication system including a macrocell and a closed cell wherein unspecified users are allowed to access the macrocell and specified users are allowed to access the closed cell, the user apparatus comprising:

a measurement unit configured to measure quality of a signal provided from a camped cell in an idle state;

a cell search unit configured to measure quality of a signal provided from a neighbour cell; and a cell reselection unit configured to perform cell reselection depending on the measurements, wherein in a case of a frequency of the macrocell being identical to a frequency of the closed cell, if a predefined reselection criterion is satisfied, the closed cell adjacent to the camped cell is reselected as a standby cell, the predefined reselection criterion corresponding to a state where the quality of the signal provided from the closed cell has been higher than or equal to the quality of the signal provided from the camped cell by a predefined threshold for longer than or equal to a predefined reselection duration, and in a case of the frequency of the macrocell being different from the frequency of the closed cell, if a predefined suitability criterion is satisfied, the closed cell adjacent to the camped cell is reselected as the standby cell, the predefined suitability criterion corresponding to a state where the quality of the signal provided from the closed cell is higher than or equal to a predefined threshold.

2. The user apparatus as claimed in claim 1, wherein it is determined whether the user apparatus is allowed to access the closed cell before determination as to whether the reselection criterion is satisfied.

3. The user apparatus as claimed in claim 1, wherein it is determined whether the user apparatus is allowed to access the closed cell after determination as to whether the reselection criterion is satisfied.

4. The user apparatus as claimed in claim 1, wherein if the quality of the signal provided from the camped cell drops below a predefined threshold, the cell search unit measures the quality of the signal provided from the adjacent cell.

5. A method for use in a user apparatus in a mobile communication system including a macrocell and a closed cell wherein unspecified users are allowed to access the macrocell and specified users are allowed to access the closed cell, the method comprising:

measuring quality of a signal provided from a camped cell in an idle state;

measuring quality of a signal provided from a neighbour cell; and performing cell reselection depending on the measurements, wherein in a case of a frequency of the macrocell being identical to a frequency of the closed cell, if a predefined reselection criterion is satisfied, the closed cell adjacent to the camped cell is reselected as a standby cell, the predefined reselection criterion corresponding to a state where the quality of the signal provided from the closed cell has been higher than or equal to the quality of the signal provided from the camped cell by a predefined threshold for longer than or equal to a predefined reselection duration, and in a case of the frequency of the macrocell being different from the frequency of the closed cell, if a predefined suitability criterion is satisfied, the closed cell adjacent to the camped cell is reselected as the standby cell, the predefined suitability criterion corresponding to a state where the quality of the signal provided from the closed cell is higher than or equal to a predefined threshold.

6. A mobile communication system including a macrocell and a closed cell wherein unspecified users are allowed to access the macrocell and specified users are allowed to access the closed cell, the mobile communication system comprising a user apparatus including:

a measurement unit configured to measure quality of a signal provided from a camped cell in an idle state;

a cell search unit configured to measure quality of a signal provided from a neighbour cell; and a cell reselection unit configured to perform cell reselection depending on the measurements, wherein in a case of a frequency of the macrocell being identical to a frequency of the closed cell, if a predefined reselection criterion is satisfied, the closed cell adjacent to the camped cell is reselected as a standby cell, the predefined reselection criterion corresponding to a state where the quality of the signal provided from the closed cell has been higher than or equal to the quality of the signal provided from the camped cell by a predefined threshold for longer than or equal to a predefined reselection duration, and in a case of the frequency of the macrocell being different from the frequency of the closed cell, if a predefined suitability criterion is satisfied, the closed cell adjacent to the camped cell is reselected as the standby cell, the predefined suitability criterion corresponding to a state where the quality of the signal provided from the closed cell is higher than or equal to a predefined threshold.

7. A user apparatus for use in a mobile communication system including a macrocell and a closed cell wherein unspecified users are allowed to access the macrocell and specified users are allowed to access the closed cell, the user apparatus comprising:

a measurement unit configured to measure quality of a signal provided from a camped cell in an idle state;

a cell search unit configured to measure quality of a signal provided from a neighbour cell if the quality of the signal provided from the camped cell is lower than a predefined threshold; and a cell reselection unit configured to perform cell reselection depending on the measurements, wherein in a case of a frequency of the macrocell being different from a frequency of the closed cell, if both of predefined first and second suitability criteria are satisfied, the macrocell adjacent to the camped cell is reselected as a standby cell, the predefined first suitability criterion corresponding to a state where the quality of the signal provided from any closed cell is lower than or equal to a predefined threshold, and the predefined second suitability criterion corresponding to a state where the quality of the signal provided from at least one macrocell is higher than or equal to a predefined threshold.

8. A method for use in a user apparatus in a mobile communication system including a macrocell and a closed cell wherein unspecified users are allowed to access the macrocell and specified users are allowed to access the closed cell, the method comprising:

measuring quality of a signal provided from a camped cell in an idle state;

measuring quality of a signal provided from a neighbour cell if the quality of the signal provided from the camped cell is lower than a predefined threshold; and performing cell reselection depending on the measurements, wherein in a case of a frequency of the macrocell being different from a frequency of the closed cell, if both of predefined first and second suitability criteria are satisfied, the macro cell adjacent to the camped cell is reselected as a standby cell, the predefined first suitability criterion corresponding to a state where the quality of the signal provided from any closed cell is lower than or equal to a predefined threshold, and the predefined second suitability criterion corresponding to a state where the quality of the signal provided from at least one macrocell is higher than or equal to a predefined threshold.

9. A mobile communication system including a macrocell and a closed cell wherein unspecified users are allowed to access the macrocell and specified users are allowed to access the closed cell, the mobile communication system comprising a user apparatus including:

a measurement unit configured to measure quality of a signal provided from a camped cell in an idle state;

a cell search unit configured to measure quality of a signal provided from a neighbour cell if the quality of the signal provided from the camped cell is lower than a predefined threshold; and a cell reselection unit configured to perform cell reselection depending on the measurements, wherein in a case of a frequency of the macrocell being different from a frequency of the closed cell, if both of predefined first and second suitability criteria are satisfied, the macro cell adjacent to the camped cell is reselected as a standby cell, the predefined first suitability criterion corresponding to a state where the quality of the signal provided from any closed cell is lower than or equal to a predefined threshold, and the predefined second suitability criterion corresponding to a state where the quality of the signal provided from at least one macrocell is higher than or equal to a predefined threshold.

10. A user apparatus for use in a mobile communication system including a macrocell and a closed cell wherein unspecified users are allowed to access the macrocell and specified users are allowed to access the closed cell, the user apparatus comprising:

a measurement unit configured to measure quality of a signal provided from a camped cell in an idle state;

a cell search unit configured to measure quality of a signal provided from a neighbour cell if the quality of the signal provided from the camped cell is lower than a predefined threshold; and a cell reselection unit configured to perform cell reselection depending on the measurements, wherein in a case of a frequency of the macrocell being different from a frequency of the closed cell, if a predefined reselection criterion is satisfied, the closed cell adjacent to the camped cell is reselected as a standby cell, the predefined reselection criterion corresponding to a state where the quality of the signal provided from the adjacent closed cell has been higher than or equal to the quality of the signal provided from the camped cell by a predefined threshold for longer than or equal to a predefined cell reselection duration, and if the predefined reselection criterion is not satisfied but both of predefined first and second suitability criteria are satisfied, the macrocell adjacent to the camped cell is reselected as the standby cell, the predefined first suitability criterion corresponding to a state where the quality of the signal provided from any closed cell is lower than or equal to a predefined threshold, and the predefined second suitability criterion corresponding to a state where the quality of the signal provided from at least one macrocell is higher than or equal to a predefined threshold.

11. The user apparatus as claimed in claim 10, wherein it is determined whether the user apparatus is allowed to access the closed cell before determination as to whether both of the predefined first and second suitability criteria are satisfied.

12. The user apparatus as claimed in claim 10, wherein it is determined whether the user apparatus is allowed to access the closed cell after determination as to whether both of the predefined first and second suitability criteria are satisfied.

13. A method for use in a user apparatus in a mobile communication system including a macrocell and a closed cell wherein unspecified users are allowed to access the macrocell and specified users are allowed to access the closed cell, the method comprising:
- measuring quality of a signal provided from a camped cell in an idle state;
- measuring quality of a signal provided from a neighbour cell if the quality of the signal provided from the camped cell is lower than a predefined threshold; and
- performing cell reselection depending on the measurements,
- wherein in a case of a frequency of the macrocell being different from a frequency of the closed cell,
- if a predefined reselection criterion is satisfied, the closed cell adjacent to the camped cell is reselected as a standby cell, the predefined reselection criterion corresponding to a state where the quality of the signal provided from the adjacent closed cell has been higher than or equal to the quality of the signal provided from the camped cell by a predefined threshold for longer than or equal to a predefined cell reselection duration, and
- if the predefined reselection criterion is not satisfied but both of predefined first and second suitability criteria are satisfied, the macrocell adjacent to the camped cell is reselected as the standby cell, the predefined first suitability criterion corresponding to a state where the quality of the signal provided from any closed cell is lower than or equal to a predefined threshold, and the predefined second suitability criterion corresponding to a state where the quality of the signal provided from at least one macrocell is higher than or equal to a predefined threshold.

14. A mobile communication system including a macrocell and a closed cell wherein unspecified users are allowed to access the macrocell and specified users are allowed to access the closed cell, the mobile communication system comprising a user apparatus including:
- a measurement unit configured to measure quality of a signal provided from a camped cell in an idle state;
- a cell search unit configured to measure quality of a signal provided from a neighbour cell if the quality of the signal provided from the camped cell is lower than a predefined threshold; and
- a cell reselection unit configured to perform cell reselection depending on the measurements,
- wherein in a case of a frequency of the macrocell being different from a frequency of the closed cell,
- if a predefined reselection criterion is satisfied, the closed cell adjacent to the camped cell is reselected as a standby cell, the predefined reselection criterion corresponding to a state where the quality of the signal provided from the adjacent closed cell has been higher than or equal to the quality of the signal provided from the camped cell by a predefined threshold for longer than or equal to a predefined cell reselection duration, and
- if the predefined reselection criterion is not satisfied but both of predefined first and second suitability criteria are satisfied, the macrocell adjacent to the camped cell is reselected as the standby cell, the predefined first suitability criterion corresponding to a state where the quality of the signal provided from any closed cell is lower than or equal to a predefined threshold, and the predefined second suitability criterion corresponding to a state where the quality of the signal provided from at least one macrocell is higher than or equal to a predefined threshold.

\* \* \* \* \*